March 25, 1947.　　M. J. STAMMELMAN　　2,417,889
MEANS FOR PRESERVING FOODSTUFFS
Filed Oct. 23, 1943
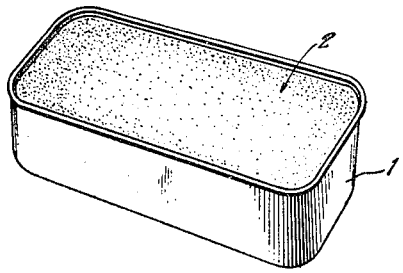
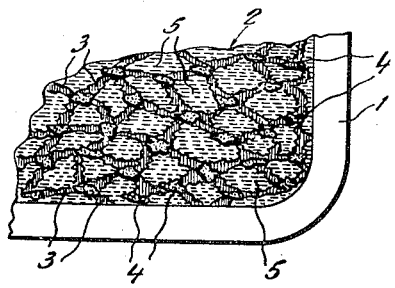
INVENTOR.
Mortimer J. Stammelman
BY
ATTORNEY Patented Mar. 25, 1947

2,417,889

UNITED STATES PATENT OFFICE 2,417,889

MEANS FOR PRESERVING FOODSTUFFS

Mortimer J. Stammelman, New York, N. Y.

Application October 23, 1943, Serial No. 507,443

4 Claims. (Cl. 99—225)

The present invention is directed to a device for conditioning enclosed spaces containing foodstuffs, and the like, such as mechanical, gas and electric refrigerators, for the purpose of improving the preservation of such materials.

As is well known, various foods although kept under refrigeration such as in the ordinary household refrigerator, tend to deteriorate rather rapidly. For instance, hard cheese varieties, such as Swiss cheese, tend to become dry and tough with storage even under ideal refrigeration. Meat and fish so stored, and especially such meats as hamburger, sausages, and the like, quickly discolor and are subject to considerable shrinkage. Fruits and vegetables tend to shrivel and wilt in a very short time. Ice cubes in the mechanical refrigerator tend to acquire a metallic taste from the metal, rubber, plastic, aluminum or other trays in which they are formed. Also, odors from one food tend to interchange with odors from other foods, and odors of decomposition tend to permeate all of the foodstuffs stored in the refrigerator.

Many attempts over a long period of years have been made to overcome these difficulties and disadvantages, and various proposals have been made seeking better preservation of foodstuffs. Quick freezing of foods has been practiced for a number of years and this, to a certain extent, is successful, but the field of usefulness is very much limited and only few foods can be so treated. The procedure is quite expensive and the cost of such foods is, in many cases, prohibitive. Preservation of some vegetables and meats has been accomplished by acetic acid, spices, and the like. Such preservation is by immersing the foods in the solution, causing a marked change in the composition of the food with a corresponding change in the taste, color and characteristics of the food. Also, it is necessary to retain the food in the solution in order to prevent deterioration and it is limited to a relatively small number of foods.

Foods have also been preserved by fumigation but this requires special apparatus in a central plant and cannot be accomplished by the individual. Furthermore, the preservation obtained is only temporary and it does not prevent discoloration or dehydration of the food. It is applicable only to a relatively small number of foods and, in some cases, may detrimentally change the flavor or color.

The present invention is intended and adapted to overcome the disadvantages set forth above in prior processes and devices for preserving food, it being among the objects of the present invention to provide a simple device which is readily made and easily handled by even inexperienced individuals, to preserve foodstuffs.

It is also among the objects of the present invention to provide a composition which is inexpensive, which is capable of use over a long period of time, and which may be readily renewed so as to be available indefinitely for the purpose of preservation of foodstuffs.

In practicing the present invention, there is provided a suitable container in which is placed an absorbent material in the form of a porous mass, usually coherent in form and of inorganic materials including metal salts. This composition retains within the same a dilute solution of acetic acid in water, and the device is placed in a refrigerator in such a position that vapors emanating from the device may permeate throughout the enclosed space.

In the accompanying drawing constituting a part hereof, and in which like reference characters indicate like parts—

Fig. 1 is a perspective view of a form of container suitable for the present purpose and having the composition of the present invention therein; and Fig. 2 is a fragmentary cross-sectional view considerably enlarged, showing the nature of the composition within the container.

The container 1 which may be of glass, metal, ceramics, plastics or any other suitable material which is permanent in character, is filled with a composition 2 the upper surface of which is somewhat below the top edge of container 1. The composition consists of a binder of plaster of Paris 3 which has uniformly disseminated therethrough fine particles 4 of diatomaceous earth. Various proportions of the materials may be used, but usually there is a considerably greater amount of the plaster of Paris than of the diatomaceous earth. A composition which has proven effective consists of 4 parts by weight of plaster of Paris and one part by weight of diatomaceous earth, the latter being of such fineness that it passes through a 100 mesh screen. The range of particle size is from 1–40 microns, the predominating range being 2–20 microns, and about 14% being retained on a 325 mesh screen.

The ingredients are intimately mixed dry and water is added with stirring until the entire homogeneous mixture is wet and free-flowing. It is poured into container 1 and allowed to set, after which it is dried. A dilute solution 5 of from 3 to 6% by weight of acetic acid in water is poured over the mass slowly until the same is absorbed thereby. Usually, the amount of solution is about one pound absorbed in a mass of about 100 cubic inches. The container is placed on a shelf below the refrigerator coil in a mechanical refrigerator. It is capable of suitably conditioning a refrigerator of from 4 to 6 cubic feet capacity for about 45 days. Thereafter, additional acetic acid solution is added to replace that which has evaporated.

Actual practice has shown that excellent results are obtained in the preservation of foodstuffs by the present invention. However, the reasons for the results are not entirely clear. It is believed that the calcium sulphate forms a saturated solution which is, of course, quite dilute due to the relative insolubility thereof. This solution seems to hold the acetic acid against too rapid evaporation and the calcium sulphate tends to give up the solution of acetic acid and water at a sufficient rate to maintain a relative uniform concentration of acetic acid vapor in the enclosed space. The diatomaceous earth being highly porous holds the acetic acid solution and seems to liberate the same as required by the calcium sulphate. It may well be that the calcium sulphate is enabled to operate in the desired manner because it forms various hydrates and may automatically release acetic acid solution by change of one hydrate to another.

The action of the mixture of acetic acid and water vapor on the foodstuffs to preserve the same is also not clear. It may be that in protein foodstuffs, such as cheese, meats, and the like, the acetic acid vapor coming in contact with the surface of the foods forms a loose chemical combination with the amino acids and this retains the water vapor which accompanies the acetic acid. Such condensation of water may form a seal on the surface of the food preventing the access of oxygen from the surrounding space and also preventing evaporation of water from within the food. The amount of acetic acid so absorbed is so small that there is no noticeable change in flavor of the food.

In the case of fruits and vegetables, greens, and the like, it is probable that a small amount of acetic acid is adsorbed on the surface thereof together with a considerable amount of water held mechanically thereby. This would provide water to replace that which normally tends to evaporate due to the low humidity in the refrigerator and it may act as a stabilizer to replace water at the same time as the tendency to vaporize water is operating. In the case of ice cubes, the condensation of a small amount of acetic acid on the water before it is frozen or on the ice cubes themselves changes the pH of the water and seems to overcome the metallic taste imparted by the dish in which the water is frozen. However, the amount of acid so dissolved in the same is insufficient to be tasted even by a sensitive palate. It is considerably more difficult to explain how odors are absorbed by the composition. It is believed that such odors may be soluble in acetic acid solution and they are taken up by the vapors of acetic acid and water and held thereby either physically or chemically.

In any case, the above explanation is merely an attempt to explain the phenomena which have been observed. In use, the composition has been found to be highly effective and very substantial improvement in the preservation of food has resulted from the use thereof.

While the invention has been described with a single specific example, it is quite obvious that various changes may be made in the details without departing from the spirit of the invention. For instance, the shape of the mass may be that which is found desirable for the character of the space in which it is to be fitted. It is also not necessary to have a container at all, under some circumstances, and merely the block or mass of material may be used to absorb the acetic acid. In place of the acetic, it may be possible to use other acids having similar characteristics and which will vaporize with water under the conditions stated above and not be detrimental to foodstuffs, as for instance, chloracetic acids, formic acid, lactic acid and others. The concentration of the acid in water may be varied to a considerable degree. In place of the plaster of Paris, other binders may be used but they should be such as to form a porous body, and other absorbent inorganic materials may be substituted for the diatomaceous earth, such as bentonite or fuller's earth. The showing of the relative positions of the several elements in Fig. 2 of the drawing does not necessarily correctly indicate the same, as the true relationship may be different from that shown.

These and other changes in the details of the device may be made within the scope of the invention which is based primarily upon the use of a dilute aqueous solution of a volatile aliphatic acid in contact with a saturated salt solution, so that the partial vapor pressure of the salt solution tends to humidify or condition the enclosed space, and the partial vapor pressure of the volatile acid tends to fix an aliphatic radical on amino groups of protein, which retards evaporation of moisture therefrom and retards deterioration. Therefore, the invention is to be broadly construed and not to be limited except by the character of the claims appended hereto.

What I claim is:

1. A composition adapted to condition an enclosed space to improve preservation of foodstuffs therein comprising a porous mass having within the same a dilute solution in water of acetic acid, said solution adapted to slowly vaporize into said space, said mass containing a mixture of a binder capable of setting to a coherent body and having disseminated therethrough particles of an absorbent material.

2. A composition adapted to condition an enclosed space to improve preservation of foodstuffs therein comprising a porous mass having within the same a dilute solution in water of acetic acid, said solution adapted to slowly vaporize into said space, said mass containing a mixture of a binder capable of setting to a coherent body and having disseminated therethrough particles of an absorbent material, the binder being the major constituent.

3. A composition adapted to condition an enclosed space to improve preservation of foodstuffs therein comprising a porous mass having within the same a dilute solution in water of acetic acid, said solution adapted to slowly vaporize into said space, said mass containing a mixture of a binder capable of setting to a coherent body and having disseminated therethrough particles of diatomaceous earth having a fineness of less than 100 mesh in the proportions of about 4 parts by weight of binder to one of said earth.

4. A composition adapted to condition an enclosed space to improve preservation of foodstuffs therein comprising a porous mass having within the same a dilute solution in water of acetic acid, said solution adapted to slowly vaporize into said space, said mass containing a mixture of plaster of Paris which has set to a coherent body and having disseminated therethrough particles of an absorbent material.

MORTIMER J. STAMMELMAN.

REFERENCES CITED

The following references are of record in the file of this patent:

UNITED STATES PATENTS

| Number | Name | Date |
|---|---|---|
| 2,120,020 | Coultes | June 7, 1938 |
| 1,988,373 | Coon | Jan. 15, 1935 |

FOREIGN PATENTS

| Number | Country | Date |
|---|---|---|
| 20,946 | British | 1890 |

OTHER REFERENCES

Jacobs, Food and Food Products, volume 1, 1944, page 899.